(12) United States Patent
Otaka et al.

(10) Patent No.: US 11,945,333 B2
(45) Date of Patent: Apr. 2, 2024

(54) IN-VEHICLE SYSTEM, VEHICLE, AND COMMUNICATION METHOD

(71) Applicant: HONDA MOTOR CO., LTD., Tokyo (JP)

(72) Inventors: Masaru Otaka, Wako (JP); Ryusuke Tamanaha, Wako (JP); Yusuke Oi, Tokyo (JP); Takahiro Iijima, Tokyo (JP); Naoko Imai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 349 days.

(21) Appl. No.: 17/133,693

(22) Filed: Dec. 24, 2020

(65) Prior Publication Data

US 2021/0206289 A1 Jul. 8, 2021

(30) Foreign Application Priority Data

Jan. 7, 2020 (JP) .................................. 2020-000787

(51) Int. Cl.
*B60L 58/12* (2019.01)
*B60L 53/66* (2019.01)
*H04W 4/44* (2018.01)
*H04W 4/46* (2018.01)

(52) U.S. Cl.
CPC .............. *B60L 58/12* (2019.02); *B60L 53/66* (2019.02); *H04W 4/44* (2018.02); *H04W 4/46* (2018.02)

(58) Field of Classification Search
CPC .......... B60L 58/12; B60L 53/66; H04W 4/46; H04W 4/44
See application file for complete search history.

(56) References Cited

U.S. PATENT DOCUMENTS

| 8,639,409 B2* | 1/2014 | Ramaswamy .......... B60L 53/65 700/297 |
| 2015/0282245 A1 | 10/2015 | Scheim et al. |
| 2016/0081055 A1 | 3/2016 | Chika et al. |
| 2017/0150531 A1 | 5/2017 | Horbatt |

(Continued)

FOREIGN PATENT DOCUMENTS

| CN | 108377464 | 8/2018 |
| DE | 102016121384 | 5/2017 |
| JP | 2011-227820 | 11/2011 |

(Continued)

OTHER PUBLICATIONS

Chinese Office Action for Chinese Patent Application No. 202011542173.8 dated Apr. 29, 2023.

(Continued)

*Primary Examiner* — Peter D Nolan
*Assistant Examiner* — Roy Rhee
(74) *Attorney, Agent, or Firm* — Amin, Turocy & Watson, LLP

(57) ABSTRACT

A communication device includes a communicator that is mounted in a mobile body and functions as a wireless access point, a power supplier configured to supply electric power at least to a driver that causes the mobile body to travel, a detector configured to detect the electric energy of the power supplier, and a controller configured to control at least one of communication strength and communication quality of the communicator based on the electric energy detected by the detector.

14 Claims, 13 Drawing Sheets

(56) References Cited

U.S. PATENT DOCUMENTS

2018/0098227 A1\* 4/2018 Carnelli ................ H04W 4/029
2018/0244163 A1   8/2018 Takehara et al.

FOREIGN PATENT DOCUMENTS

| JP | 2015-222877 | 12/2015 |
| JP | 2018-048493 | 3/2018 |
| JP | 2018-056774 | 4/2018 |

OTHER PUBLICATIONS

Japanese Office Action for Japanese Patent Application No. 2020-000787 dated Jun. 20, 2023.

\* cited by examiner

10>9>8...2>1
T+7>T+6>T+5...T+1>T
A>B>C>D

182

| INDEX OF ELECTRIC ENERGY (SOC) | CHARGING TIME UNTIL FULL CHARGE | COMMUNICATION STRENGTH |
|---|---|---|
| 10 | - | D |
| 9 | T | C |
| 8 | T+1 | B |
| 7 | T+2 | A |
| ⋮ | ⋮ | ⋮ |
| 3 | T+6 | A |
| 2 | T+7 | A |
| 1 | T+7 | A |

● VEHICLE

D(10)
C(9)
B(8)
A(1-7)

184

| TIME ZONE | 12/1 | 12/2 | ... |
|---|---|---|---|
| 10:00 | - | - | ... |
| 10:15 | RESERVATION | - | ... |
| 10:30 | RESERVATION | RESERVATION | ... |
| 10:45 | - | - | ... |
| ⋮ | ⋮ | ⋮ | ⋮ |

IN-VEHICLE SYSTEM, VEHICLE, AND COMMUNICATION METHOD

CROSS-REFERENCE TO RELATED APPLICATION

Priority is claimed on Japanese Patent Application No. 2020-000787, filed Jan. 7, 2020, the content of which is incorporated herein by reference.

BACKGROUND

Field of the Invention

The present invention relates to an in-vehicle system, and a vehicle, a communication method.

Description of Related Art

Conventionally, a base station device for cellular mobile communication has been disclosed (for example, refer to Patent Literature 1). This base station device includes a first wireless communicator that performs wireless communication with a fixed base station or another base station installed in another mobile body via a first antenna, a second wireless communicator that performs wireless communication with a user device via a second antenna, and a relay controller that controls the first wireless communicator and the second wireless communicator to form a mobile cell at least in an outer peripheral area of the moving body and relay communication between a user device positioned in the mobile cell and the fixed base station or another base station device installed in the fixed base station or the another mobile body (Japanese Unexamined Patent Application, First Publication No. 2018-56774).

However, the base station device described above may not be convenient for users.

SUMMARY

The present invention has been made in view of such circumstances, and an object thereof is to provide an in-vehicle system, a vehicle, a communication method, and a storage medium that are more convenient for users.

The in-vehicle system, vehicle, communication method, and storage medium according to the present invention have adopted the following configuration.

(1): A communication device according to one aspect of the present invention includes a communicator that is mounted in a mobile body and functions as a wireless access point, a power supplier configured to supply electric power at least to a driver which causes the mobile body to travel, a detector configured to detect the electric energy of the power supplier, and a communication controller configured to control at least one of communication strength (strength of communication) and communication quality of the communicator based on the electric energy detected by the detector.

(2): In the aspect of (1) described above, the communication controller controls the communication strength of the communicator to be a first communication strength when the electric energy is less than a threshold value, and controls the communication strength of the communicator to be a second communication strength that is smaller than the first communication strength when the electric energy is equal to or higher than the threshold value.

(3): In the aspect of (1) or (2) described above, the communication controller controls a communication distance of the communicator such that communication between the communicator and a terminal device present at a first distance from the communicator is possible when the electric energy is less than a threshold value, and controls a communication distance of the communicator such that communication with a terminal device present at the first distance from the communicator is not performed and communication between the communicator and a terminal device present at a second distance shorter than the first distance is possible when the electric energy is equal to or higher than the threshold value.

(4): In the aspect of any one of (1) to (3) described above, when the power supplier is charged by a charging facility outside the mobile body, the communicator functions as the wireless access point.

(5): In the aspect of any one of (1) to (4) described above, the power supplier supplies electric power to the driver and the communicator.

(6): A communication device according to another aspect of the present invention includes a communicator that is mounted in a mobile body and functions as a wireless access point, a power supplier configured to supply electric power at least to a driver that causes the mobile body to travel, an acquirer configured to acquire specific information for estimating a time at which the power supplier supplies the electric power to the driver and causes the mobile body to travel, and a controller configured to control communication strength of the communicator based on specific information acquired by the acquirer.

(7): In the aspect of (6) described above, the specific information includes one or more pieces of information among electric energy detected by a detector that detects the electric energy of the power supplier, a usage history of the mobile body, a usage schedule in which the usage schedule of the mobile body is defined, and a time in which the mobile body has stopped in the past in a facility where the mobile body stops.

(8): In the aspect of any one of (1) to (7) described above, the mobile body is a vehicle used for a car sharing service in which a plurality of users jointly use a vehicle.

(9): A vehicle in which the communication device in the aspect of any one of (1) to (9) described above is mounted.

(10): A communication method according to still another aspect of the present invention includes, by a computer, acquiring electric energy detected by a detector that detects the electric energy of a power supplier which supplies the electric power at least to a driver that causes a mobile body to travel, and controlling at least one of communication strength and communication quality of a communicator that is mounted in a mobile body and functions as a wireless access point based on the acquired electric energy.

(11): A non-transitory computer readable storage medium storing a program causing a computer to execute acquiring electric energy detected by a detector that detects the electric energy of a power supplier which supplies the electric power at least to a driver that causes a mobile body to travel, and controlling at least one of communication strength and communication quality of a communicator that is mounted in a mobile body and functions as a wireless access point based on the acquired electric energy.

According to the aspects of (1) to (5), and (8) to (11), a communication device controls at least one of communication strength and communication quality of a communicator based on electric energy detected by a detector, thereby improving convenience for users.

According to the aspects of (6) and (7), a communication device controls communication strength of a communicator based on specific information, thereby improving convenience for users.

DETAILED DESCRIPTION OF THE INVENTION

Hereinafter, embodiments of a communication device, a vehicle, a communication method, and a storage medium of the present invention will be described with reference to the drawings. As used throughout this disclosure, the singular forms "a," "an," and "the" include plural reference unless the context clearly dictates otherwise.

First Embodiment

Figure 1:
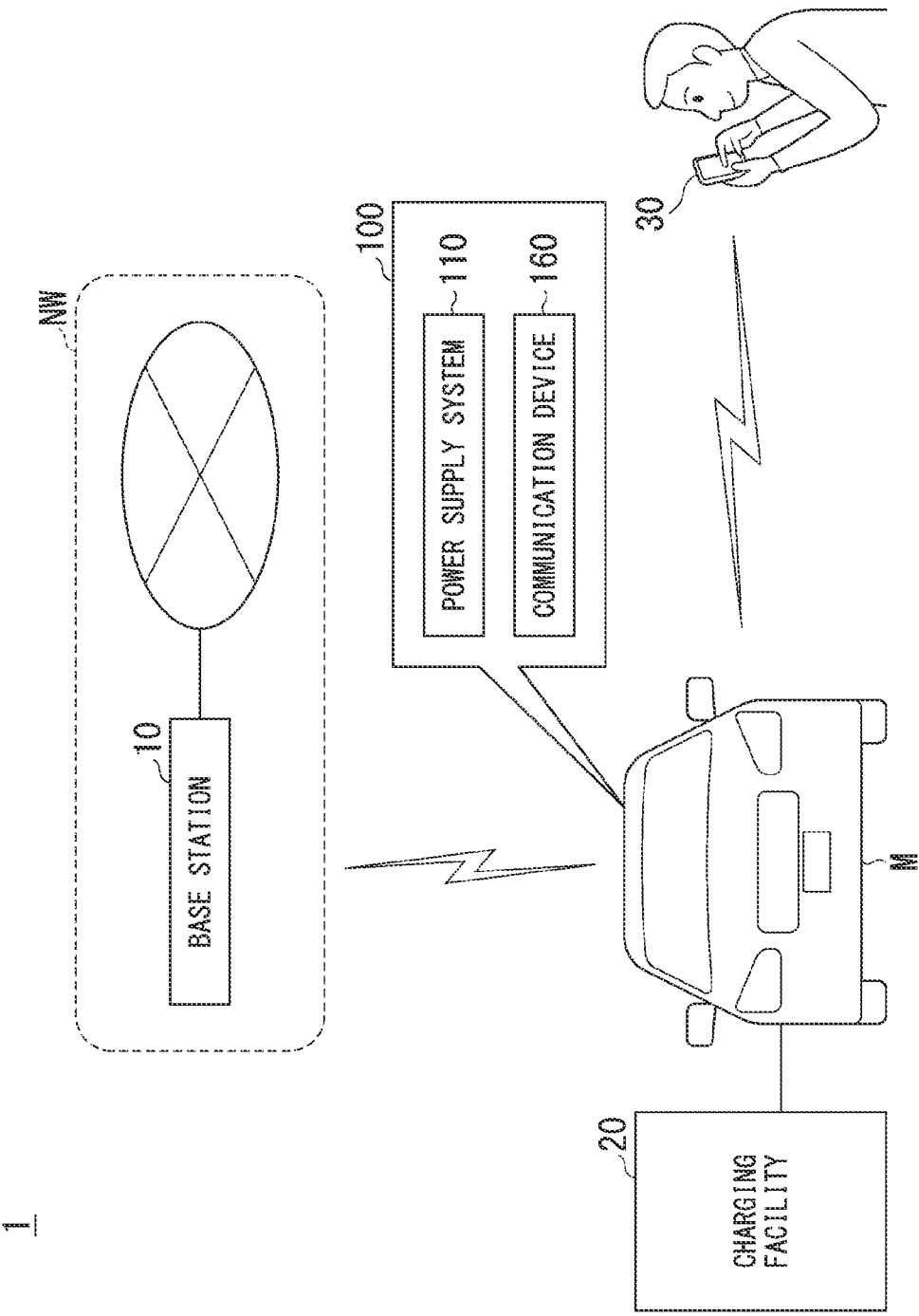
FIG. 1 is a diagram which shows an example of a configuration of a communication system.

FIG. 1 is a diagram which shows an example of a configuration of a communication system 1. The communication system 1 includes, for example, a base station 10, a charging facility 20, a portable terminal 30, and a vehicle M.

The base station 10 is, for example, a wireless base station that is fixed to a predetermined position and used. The base station 10 is included in a network NW. The network NW includes, for example, a cellular network, a Wi-Fi network, the Internet, a wide area network (WAN), a local area network (LAN) dedicated line, and the like.

The charging facility 20 supplies electric power to a battery when it is electrically connected to the battery of the vehicle M by an electric power line or the like. As a result, the battery of vehicle M is charged. The charging facility 20 is connected to, for example, an electric power system, and supplies electric power supplied by the electric power system to the battery of the vehicle M. The charging facility 20 converts, for example, electric power of a predetermined voltage and a predetermined current supplied by the electric power system into electric power of a voltage and a current suitable for charging the battery and supplies the electric power of the converted voltage and current to the battery. The charging facility 20 may supply electric power to the battery of the vehicle M by non-contact charging.

The portable terminal 30 is a terminal device carried by a user U. The portable terminal 30 is a smart-phone, a tablet terminal, a laptop computer, or the like. When the portable terminal 30 is present in an area in which communication with the communication device 160 of the vehicle M is possible, the portable terminal 30 is connected to the network NW with the communication device 160 as an access point. When the portable terminal 30 is present in an area in which communication with the base station 10 is possible, it may communicate with the base station 10 instead of communicating with the communication device 160 of the vehicle M.

Figure 2:
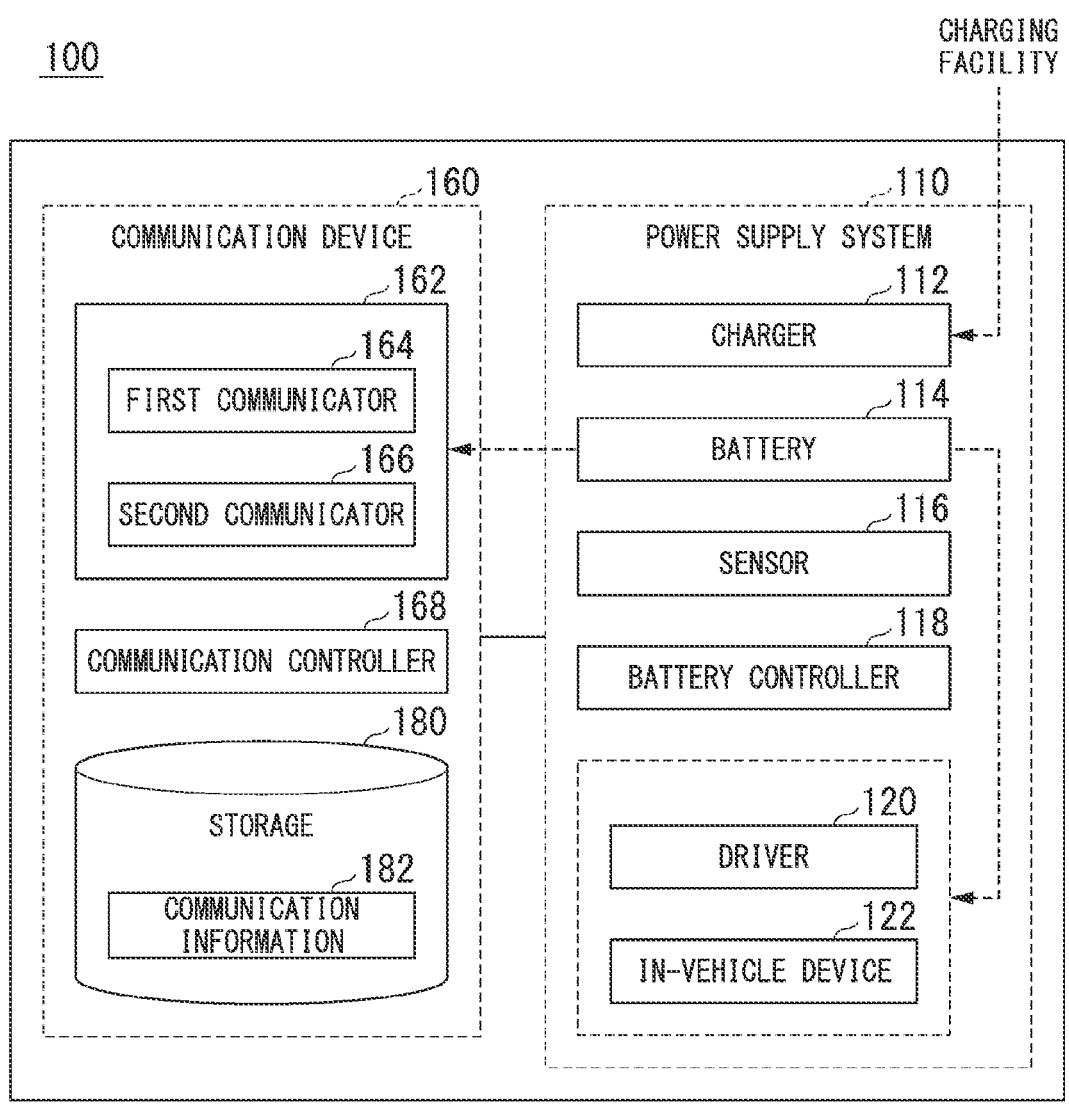
FIG. 2 is a diagram which shows an example of a functional configuration of a vehicle.

FIG. 2 is a diagram which shows an example of a functional configuration of the vehicle M. The vehicle M is, for example, an electric vehicle that travels using electric power. The vehicle M may be a vehicle that travels using electric power according to the situation and condition of the vehicle M and is not limited to an electric vehicle that exclusively uses the battery 114 as a power source, but may also be a hybrid vehicle equipped with an engine or a fuel cell vehicle equipped with a fuel cell. The vehicle M is, for example, a vehicle used for a car sharing service. The car sharing service is a service that allows a user with a pre-registered authority to use a jointly used vehicle at a requested time. For example, the in-vehicle system 100 is mounted in the vehicle M.

[In-Vehicle System]

The in-vehicle system 100 includes a power supply system 110 and a communication device 160.

[Power Supply System]

The power supply system 110 includes, for example, a charger 112, a battery (a power supplier) 114, a sensor (a detector) 116, a battery controller 118, a driver 120, and an in-vehicle device 122. The charger 112 receives electric power provided by the charging facility 20 and supplies the received electric power to the battery 114.

The battery 114 is a secondary battery that stores electric power such as a lithium ion battery. The battery 114 supplies the stored electric power to the driver 120 and (or) the in-vehicle device 122. The battery 114 supplies electric power to the communicator 162. The sensor 116 is a detector that acquires information of the battery 114. The sensor 116 detects information (for example, charge/discharge current, voltage, temperature, and the like of the battery 114) for deriving an index (for example, a state of charge (SOC))

indicating the electric energy stored in the battery 114, and outputs the information to the communication device 160. The communication device 160 derives the electric energy of the battery 114 on the basis of the information for deriving the electric energy.

The battery controller 118 controls the battery 114 on the basis of an operation of a user of the vehicle M, and provides the electric power of the battery 114 to the driver 120, the in-vehicle device 122, and the communicator 162. The battery controller 118 provides information acquired by the sensor 116 to the communication device 160. The battery controller 118 may derive the electric energy of the battery 114 and output the derived electric energy to the communication device 160 on the basis of the information detected by the sensor 116.

The driver 120 is an electric motor that rotates a drive wheel (not shown) of the vehicle M. The driver 120 generates power using the electric power supplied from the battery 114 and outputs the generated power to the drive wheel. The vehicle M travels by using the power output to the drive wheels.

The in-vehicle device 122 includes an air conditioning device, a navigation system, a light, an audio system, and the like mounted in the vehicle M. The in-vehicle device 122 operates using, for example, the electric power supplied to the battery 114.

[Communication Device]

The communication device 160 includes, for example, a communicator 162, a communication controller 168, and a storage 180. The communication controller 168 may be realized by, for example, a processor such as a central processing unit (CPU) executing a program (software) stored in the storage 180. The communication controller 168 may be realized by hardware such as large scale integration (LSI), an application specific integrated circuit (ASIC), a field-programmable gate array (FPGA), or a graphics processing unit (GPU), and may also be realized by software and hardware in cooperation. The program may be stored in a storage device such as a hard disk drive (HDD) or a flash memory in advance, or may also be stored in a detachable storage medium such as a DVD or a CD-ROM and installed in the storage device by the storage medium being attached to a drive device. Some functional units of these functions of the communication controller 168 may also be distributed to other devices. Information stored in the storage 180 may also be stored in other storage devices.

The storage 180 may be realized by an HDD, a flash memory, a random access memory (RAM), a read only memory (ROM), and the like.

The communicator 162 includes, for example, a first communicator 164 and a second communicator 166. The first communicator 164 is a communication interface for communicating with the base station 10. The first communicator 164 includes an antenna, a wireless communicator, and the like. The first communicator 164 may also be connected to a direct network NW without going through the base station 10.

The second communicator 166 is a communication interface for communicating with the portable terminal 30. The second communicator 166 includes an antenna, a wireless communicator, and the like. In the operation of the first communicator 164 and the second communicator 166, the second communicator 166 functions as a wireless access point. That is, the portable terminal 30 can communicate with the base station 10 or the network NW via the first communicator 164 and the second communicator 166.

The first communicator 164 or the second communicator 166 operates by using electric power supplied to the battery 114. The first communicator 164 or the second communicator 166 may operate by electric power supplied through a battery (not shown) different from the battery 114. This battery is a battery with lower performance than the battery 114, and is connected to, for example, the communicator 162, the driver 120, or the in-vehicle device 122. Lower performance indicates that the battery (a lead battery) has a charge capacity smaller than that of the battery 114 or a degree of charge or a degree of discharge per unit time smaller than that of battery 114.

The communication controller 168 controls at least one of a communication strength and a communication quality of the second communicator 166 on the basis of the electric energy of a battery described below. Details of the processing will be described below. Controlling the communication quality includes controlling a degree of delay in communication, controlling a degree of interference of radio waves used in communication, and the like. For example, a communication band according to the communication quality is used.

Figures 3, 4:
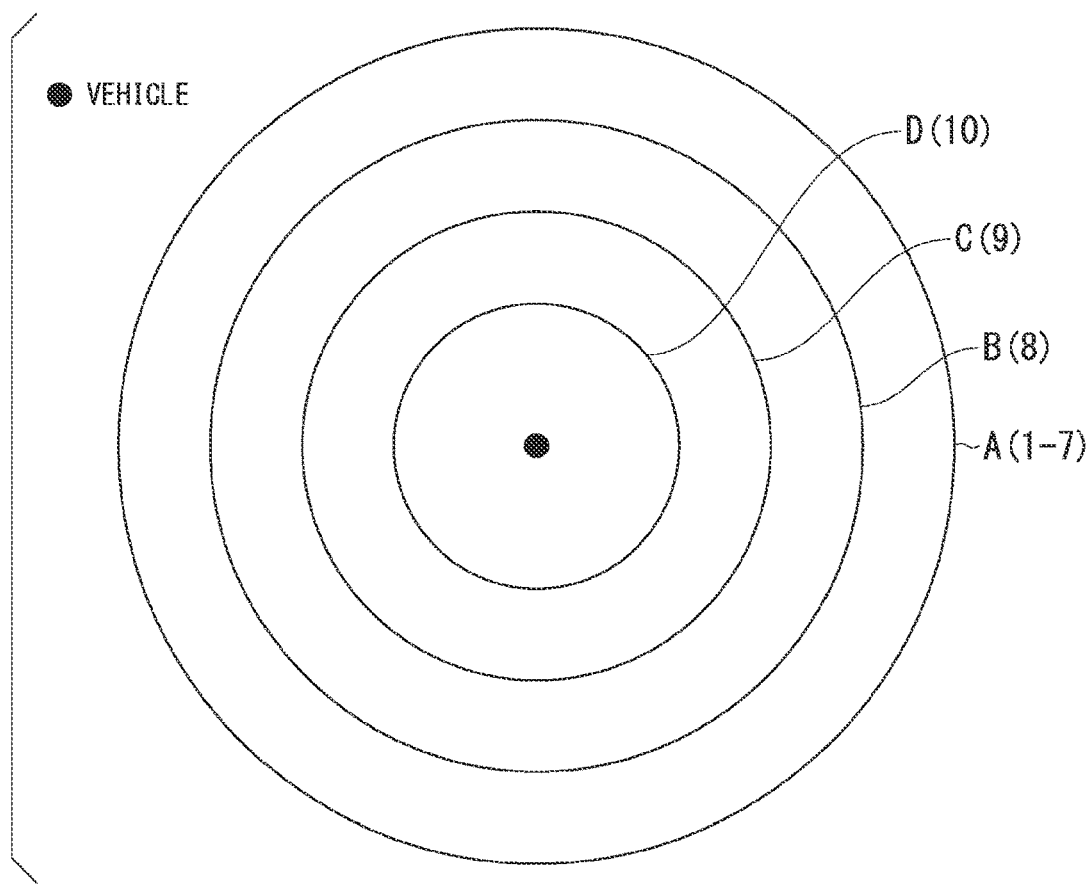
FIG. 3 is a diagram which shows an example of content of communication information.
FIG. 4 is a diagram which shows a result of a communication controller controlling a second communicator using communication information of FIG. 3.

For example, the communication information 182 is stored in the storage 180. FIG. 3 is a diagram which shows an example of content of the communication information 182. The communication information 182 is information for determining a communication state of the second communicator 166. The communication information 182 is information in which a charging time until the battery 114 is fully charged and information indicating a communication state (for example, communication strength) are associated with an index of electric energy (for example, an SOC). The communication state is, for example, the communication strength of the radio waves (or a communication distance of the radio waves) emitted by the second communicator 166. As the communication strength increases, stronger radio waves are emitted and the communication distance becomes longer.

For example, each item of communication information 182 is set with a tendency for the communication strength of the radio waves emitted by the second communicator 166 to increase as the index of electric energy becomes smaller (as the SOC becomes lower) or as the charging time becomes longer. The communication controller 168 controls the communication strength of the second communicator 166 on the basis of the electric energy with reference to the communication information 182, and thereby the second communicator 166 communicates with the portable terminal 30 at a communication distance corresponding to the electric energy as shown in FIG. 4.

FIG. 4 is a diagram which shows a result of the communication controller 168 controlling the second communicator 166 using the communication information 182 of FIG. 3. As shown in FIG. 4, the communication controller 168 sets the communication distance of the second communicator 166 to be shorter (sets the communication strength to be smaller) as the index of electric energy becomes larger or the charging time becomes shorter. For example, a communication range of the second communicator 166 is a circular shape centered on the vehicle M. The communication distance is, for example, a radius of the circle described above.

Figure 5:
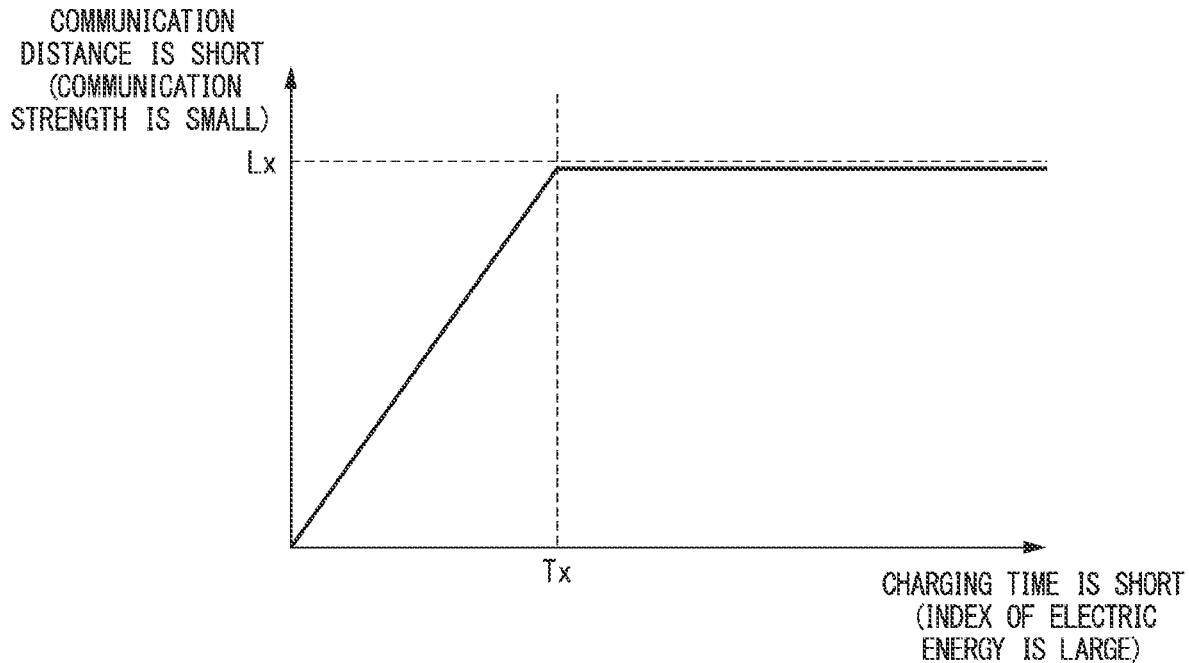
FIG. 5 is a diagram which shows an example of a tendency of a change in communication distance (communication strength) with respect to a change in time until full charge (index of electric energy).

For example, when the communication controller 168 controls the communication strength of the second communicator 166 on the basis of the index of electric energy, a relationship between the charging time until full charge and the communication distance of the second communicator 166 has a tendency shown in FIG. 5.

FIG. 5 is a diagram which shows an example of a tendency of a change in communication distance (communication strength) with respect to a change in time until full charge (index of electric energy). A vertical axis of FIG. 5 is the communication distance (the communication strength), and a horizontal axis of FIG. 5 is the charging time (the index of electric energy). As shown in FIG. 5, in a section in which the charging time is up to Tx, the communication distance becomes shorter as the charging time becomes shorter. When the charging time is a charging time Tx or is shorter than a charging time Tx, the communication distance becomes a communication distance Lx. As described above, in the section up to the charging time Tx, the communication distance may gradually become shorter, or the communication distance may become shorter step by step. Regardless of the section up to the charging time Tx, the communication distance may gradually become shorter as the charging time becomes shorter in an entire section.

[Flowchart]

Figure 6:
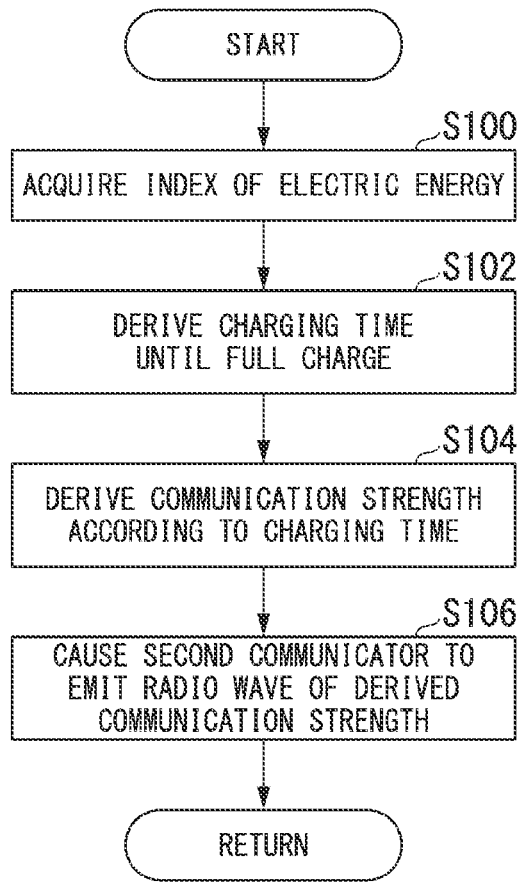
FIG. 6 is a flowchart which shows an example of a flow of processing executed by a communication device.

FIG. 6 is a flowchart which shows an example of a flow of processing executed by the communication device 160. This processing is, for example, processing executed after the vehicle M is stopped at the charging facility 20 and charging is started. First, the communication controller 168 acquires an index of the electric energy of the battery 114 (step S100). Next, the communication controller 168 derives a charging time associated with the index of the electric energy with reference to the communication information 182 (step S102) and derives communication strength according to the derived charging time (step S104). Next, the communication controller 168 causes the second communicator 166 to emit radio waves of the communication strength derived in step S104 (step S106). As a result, processing of one routine of this flowchart ends.

Figure 7:
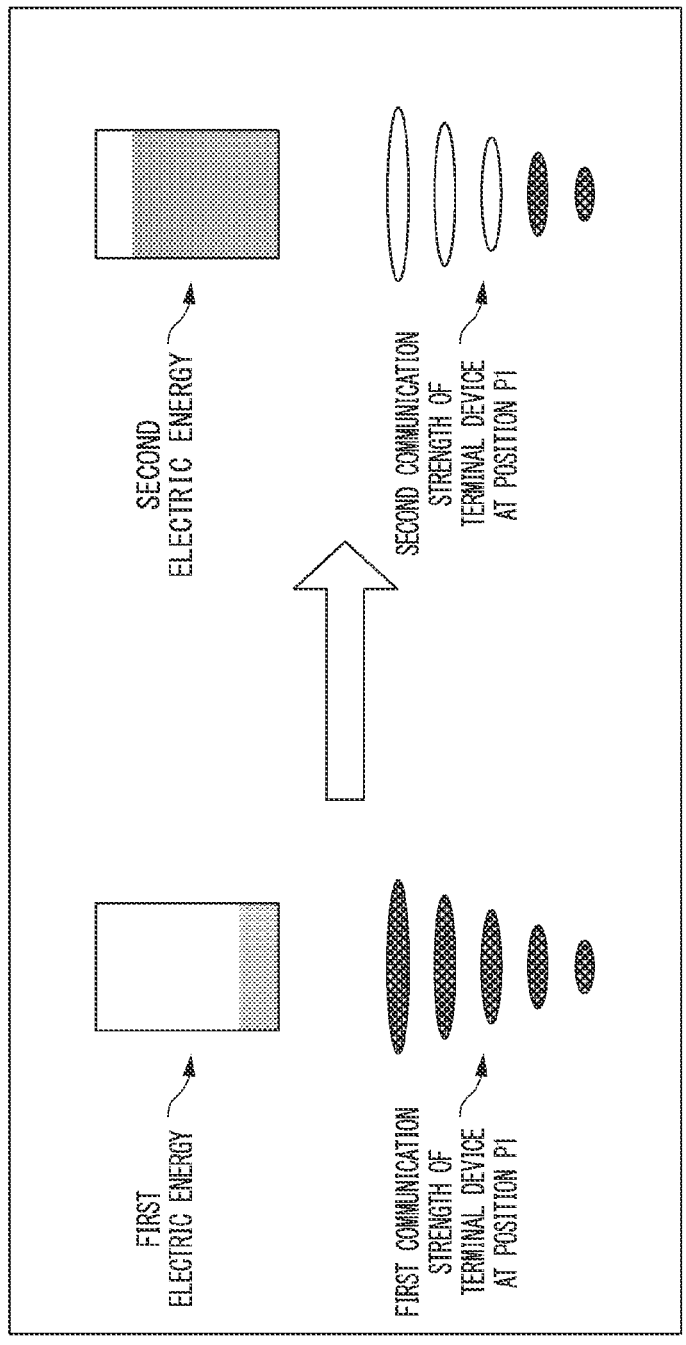
FIG. 7 is a diagram which shows an example of changes in the electric energy of the battery 114 and the communication strength of the radio waves received by the portable terminal 30 when the processing of FIG. 6 is performed.

The processing described above improves the convenience for the user as shown in FIG. 7. FIG. 7 is a diagram which shows an example of changes in the electric energy of the battery 114 and the communication strength of the radio waves received by the portable terminal 30 when the processing of FIG. 6 is performed. At a time Tx1, when the electric energy is first electric energy, the second communicator 166 emits radio waves of first communication strength. The portable terminal 30 present at a position P1 acquires the radio waves of the first communication strength as shown in FIG. 7.

At a time Tx2 after time Tx1, when the electric energy is second electric energy (electric energy greater than the first electric energy), the second communicator 166 emits radio waves of second communication strength (communication strength less than the first communication strength). The portable terminal 30 present at the position P1 acquires the radio waves of the second communication strength as shown in FIG. 7. A user of the portable terminal 30 can recognize the communication strength in communication with the second communicator 166. For example, the user can recognize that a communication speed is decreasing on the basis of information displayed on a display of the portable terminal 30 or a change the speed of an image, or recognize that the communication speed is decreasing by visually recognizing the information indicating the communication strength displayed on the display of the portable terminal 30 as shown in FIG. 7.

As described with reference to FIG. 7, when the communication strength gradually decreases, the user can predict that communication using the vehicle M as a wireless access point will not be possible after a predetermined time. As a result, the user can take action in response to the prediction of the future situation. For example, the user can search for another wireless access point or stop using the communication using the vehicle M as a wireless access point. In this manner, the user can predict a future communication state and take action. As a result, convenience for the user is improved.

In the example described above, before charging is started, the second communicator 166 may or may not function as a wireless access point. Before charging is started, the second communicator 166 may function as a wireless access point if a certain condition is satisfied. The predetermined condition is, for example, that the electric energy of the battery 114 is equal to or higher than a predetermined value (a state in which sufficient electric power is stored).

The communication device 16 may control the second communicator 166 on the basis of a type of charging. For example, the communication device 16 may change the control when normal charging is performed and when rapid charging is performed. For example, the communication device 16 controls the second communicator 166 on the basis of the electric energy as described above when normal charging is performed and may control the second communicator 166 such that it does not communicate with the portable terminal 30 when rapid charging is performed. The communication device 160 may control the second communicator 166 on the basis of the time until full charge, regardless of the type of charging.

According to the first embodiment described above, the communication device 160 controls the communication strength of the second communicator 166 on the basis of the electric energy of the battery 114, thereby improving convenience for the user. For example, the communication device 160 controls the second communicator 166 such that the communication strength is increased (the communication distance is increased) by estimating that it takes a long time to stay for charging if the electric energy is small, and the communication strength is decreased (the communication distance is decreased) by estimating that it takes a short time to stay for charging when the electric energy is large, and thereby convenience for the user is improved.

Second Embodiment

Hereinafter, a second embodiment will be described. In the second embodiment, the communication state of the second communicator 166 is controlled on the basis of a usage schedule (specific information) of a vehicle. In the following description, differences from the first embodiment will be mainly described.

Figure 8:
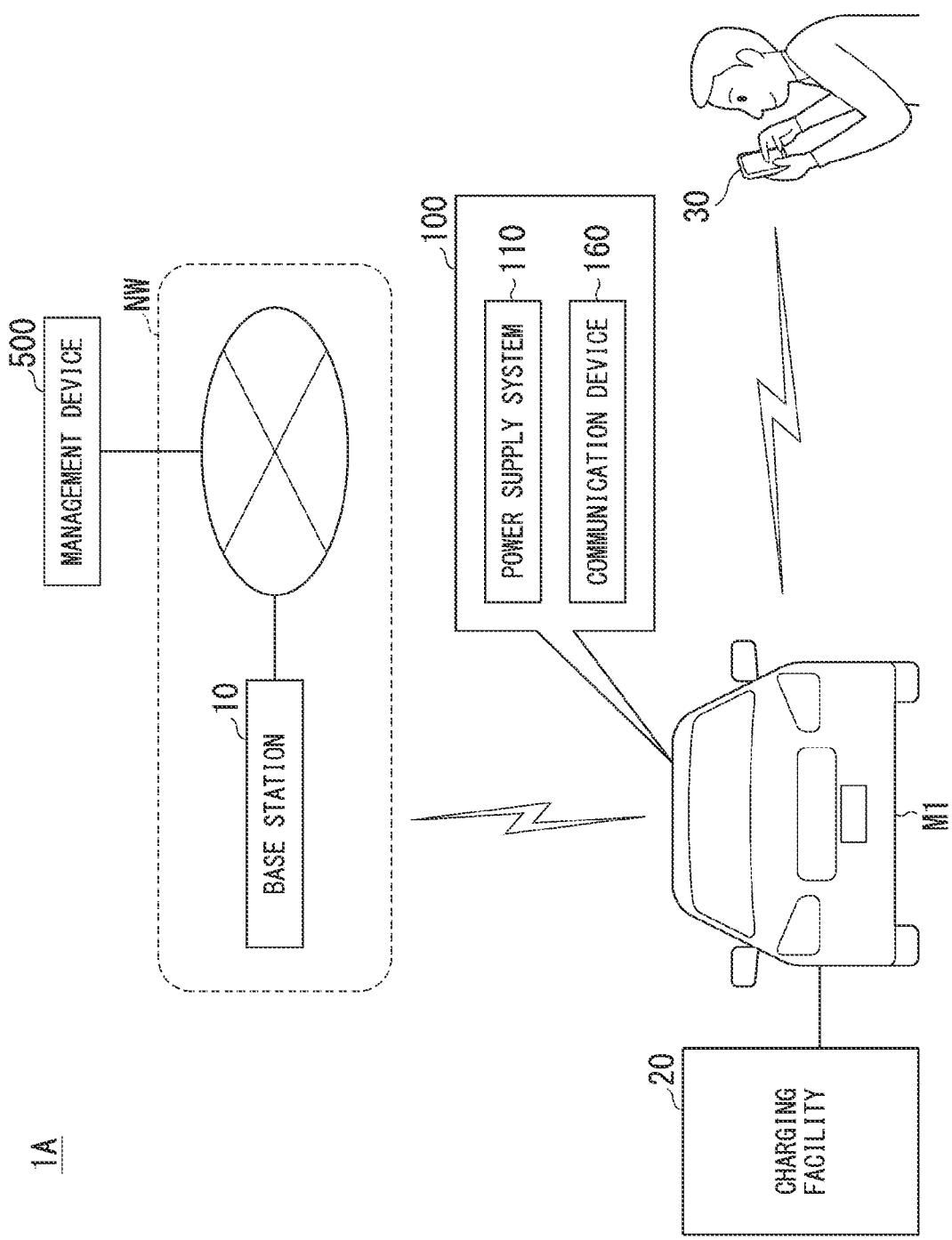
FIG. 8 is a diagram which shows an example of a configuration of a communication system of a second embodiment.

FIG. 8 is a diagram which shows an example of a configuration of the communication system 1A of the second embodiment. The communication system 1A further includes a management device 500 in addition to the configuration of the communication system 1, and includes a vehicle M1 instead of the vehicle M. The vehicle M1 is, for example, a vehicle used for a car sharing service. A user registered in the management device 500 in advance uses the vehicle M1.

The management device 500 is a device that operates the car sharing service. The management device 500 receives, for example, a request from a user and manages the received request. The request includes a date and time, a time, or the like when the user wants to use the vehicle M1. The management device 500 provides generated schedule information to the vehicle M1 on the basis of the request. Details of the schedule information will be described with reference to FIG. 10 to be described below.

Figures 9, 10:
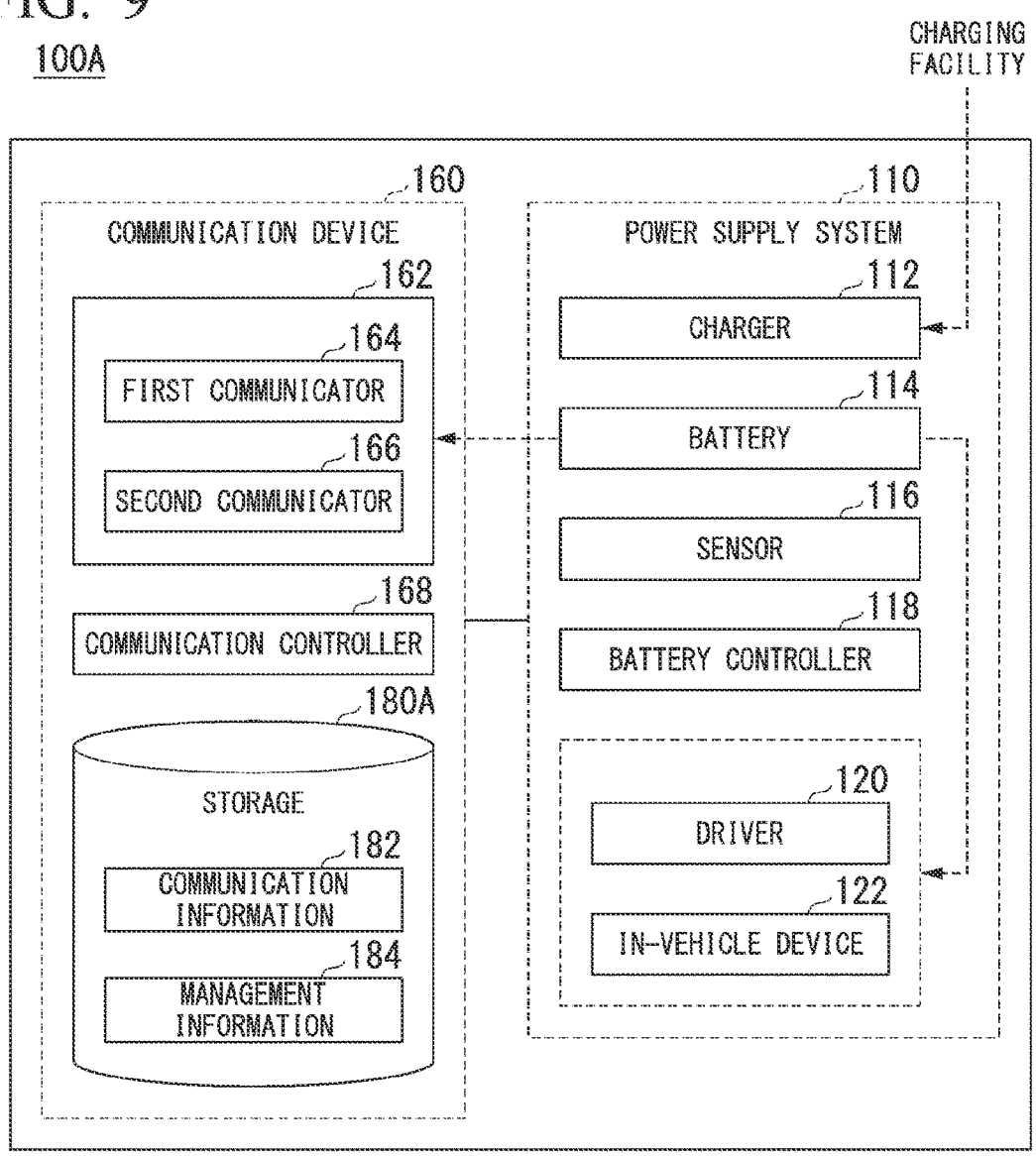
FIG. 9 is a diagram which shows an example of a functional configuration of an in-vehicle system.
FIG. 10 is a diagram which shows an example of content of management information.

FIG. 9 is a diagram which shows an example of a functional configuration of the in-vehicle system 100A. Differences from vehicle M will be mainly described. The vehicle M1 includes a storage 180A instead of the storage 180. In addition to the communication information 182, management information 184 is further stored in the storage 180A.

FIG. 10 is a diagram which shows an example of content of the management information 184. The management information 184 is information provided by the management device 500. The management information 184 is, for example, information (specific information) in which a time zone, a date, and information indicating whether a reservation for using the vehicle M1 is made are associated with each other.

[Processing]

Figure 11:
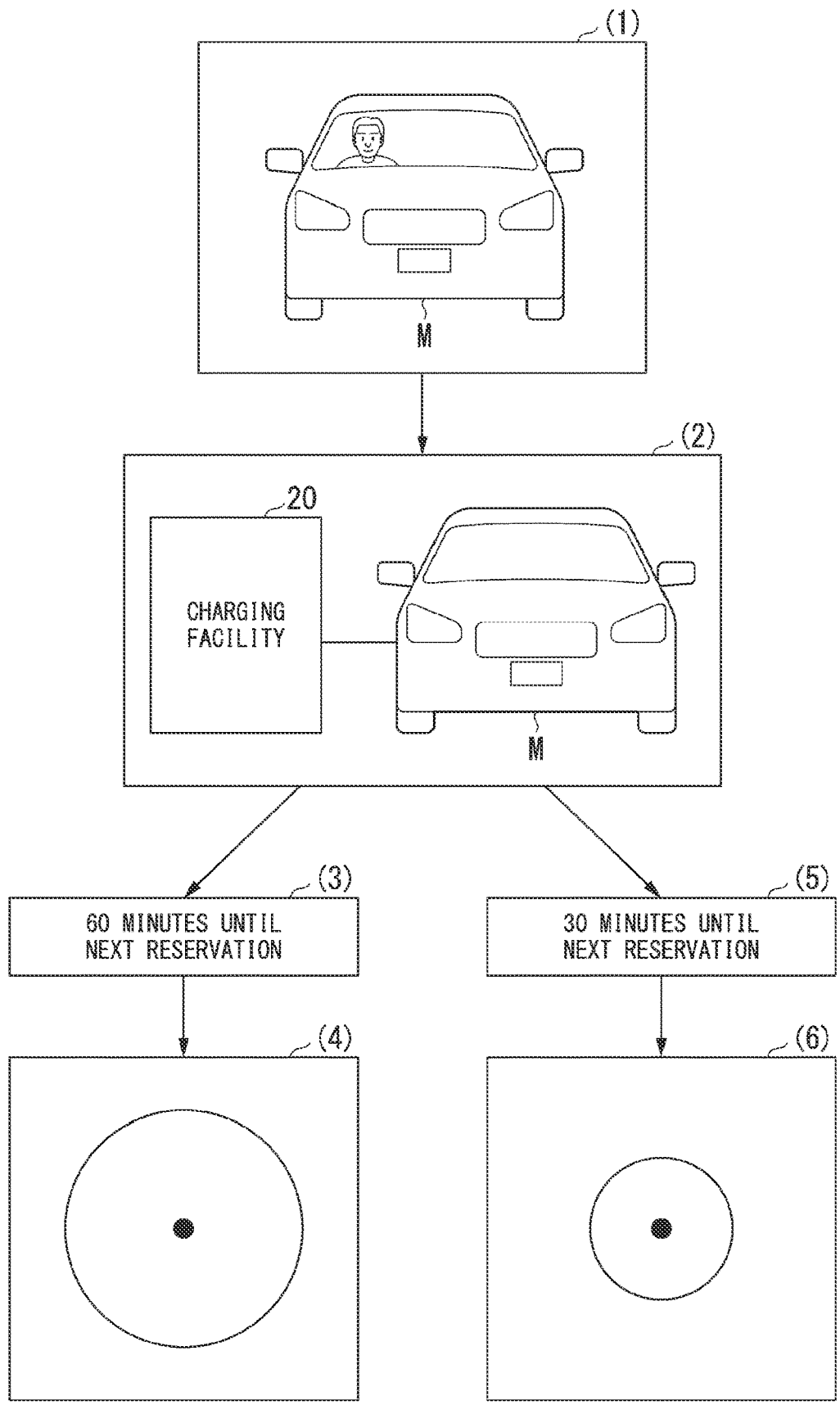
FIG. 11 is a diagram for describing processing of the second embodiment.

FIG. 11 is a diagram for describing processing of the second embodiment. The vehicle M1 is used by a user (1). The vehicle M1 is returned to a parking facility set in advance. A charging facility 20 is installed in this parking facility. Charging of the vehicle M1 is started (2).

When a time from a start of charging to a next reservation is a first time (for example, 60 minutes) (3), the second communicator 166 performs communication using the radio waves of the third communication strength such that it can communicate with the portable terminal 30 in a communication range of a third range (4). When the time from the start of charging to the next reservation is a second time (for example, 30 minutes) (5), the second communicator 166 performs communication using radio waves of a fourth communication strength (communication strength smaller than the third communication strength) such that it can communicate with the portable terminal 30 in a communication range of a fourth range (a range smaller than the communication range of the third range) (6).

[Flowchart]

Figure 12:
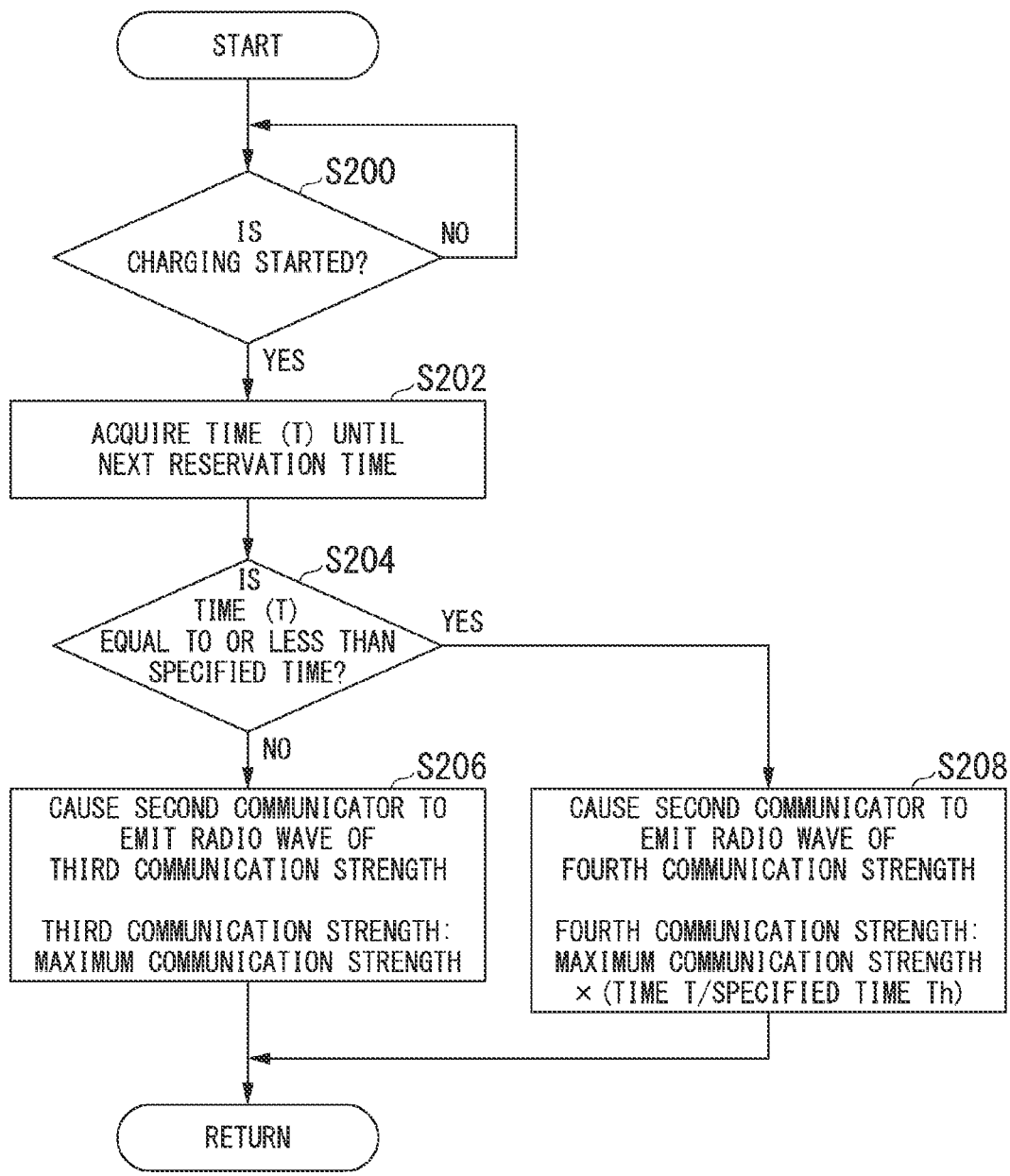
FIG. 12 is a flowchart which shows an example of a flow of processing executed by a communication device.

FIG. 12 is a flowchart which shows an example of a flow of processing executed by the communication device 160. First, the communication controller 168 determines whether charging of the battery 114 has been started on the basis of the information acquired from the battery controller 118 (step S200). When the charging of the battery 114 has been started, the communication controller 168 acquires a time (T) until a next reservation time with reference to the management information 184 (step S202). Next, the communication controller 168 determines whether the time (T) is equal to or less than a specified time (step S204). The time (T) is an example of the "specific information."

When the time (T) is not equal to or less than a specified time, the communication controller 168 causes the second communicator 166 to emit the radio wave of a third communication strength (step S206). The third communication strength is, for example, the maximum communication strength. In other words, the third communication strength is communication strength for communication by the second communicator 166 in the maximum communication range.

When the time (T) is equal to or less than the specified time, the communication controller 168 causes the second communicator 166 to emit the radio wave of a fourth communication strength (step S208). As a result, processing of one routine of this flowchart ends.

The fourth communication strength is calculated by, for example, the following equation (1). According to the equation (1), the communication strength tends to increase as a time until the vehicle M1 is used next is longer, and the communication strength tends to decrease as the time until the vehicle M1 is used next is shorter. "CS4" is the fourth communication strength, and "Csm" is the maximum communication strength that the second communicator 166 can output. "T" is the time until a next reservation time, and "Th" is the specified time.

$$CS4=CSm\times(T/Th) \quad (1)$$

As described above, the communication controller 168 changes the communication strength of the second communicator 166 according to the time until the vehicle M1 is used next. As a result, the convenience for the user is improved as in the first embodiment.

According to the second embodiment described above, the communication controller 168 can control the communication strength on the basis of a time at which a use of the vehicle M1 is estimated to start with higher accuracy. As a result, an effect of the first embodiment is obtained.

Third Embodiment

Hereinafter, a third embodiment will be described. The communication strength is controlled on the basis of the electric energy in the first embodiment, and the communication strength is controlled on the basis of the management information (specific information) in the second embodiment. In the third embodiment, the communication controller 168 controls the communication strength on the basis of information (specific information) for estimating a time when a vehicle departs, which is different from the information used in the first embodiment and the second embodiment. Hereinafter, differences from the first embodiment and the second embodiment will be mainly described.

Figure 13:
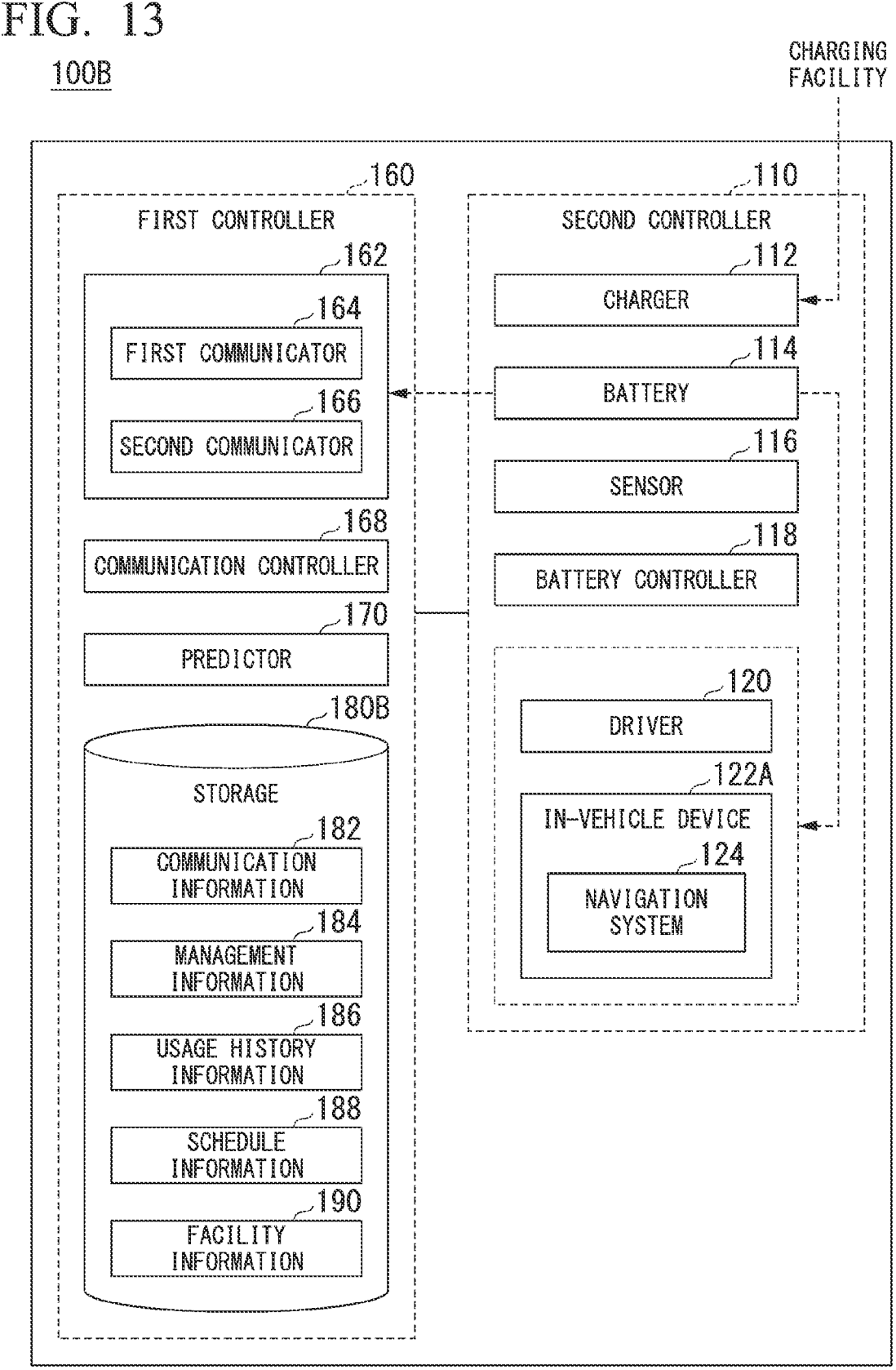
FIG. 13 is a diagram which shows an example of a functional configuration of an in-vehicle system of a third embodiment.

FIG. 13 is a diagram which shows an example of a functional configuration of an in-vehicle system 100B of the third embodiment. Differences from the in-vehicle system 100A will be mainly described. The in-vehicle system 100B further includes a predictor 170 in addition to the functional configuration of the in-vehicle system 100A, includes a storage 180B instead of the storage 180A, and includes an in-vehicle device 122A instead of the in-vehicle device 122.

The in-vehicle device 122A includes, for example, a navigation system 124. The navigation system 124 includes a positioning device that positions a position of a vehicle M2, map information, a processor that superimposes a position of the vehicle M on the map information to specify the position of the vehicle M2, and a guidance processor that guides a user with voices, images, and the like to a destination of the user.

The predictor 170 predicts a time when a parked vehicle M2 will start next by referring to information stored in the storage 180B.

In addition to the communication information 182 and the management information 184, usage history information 186, schedule information 188, and facility information 190 are further stored in the storage 180B.

Figure 14:
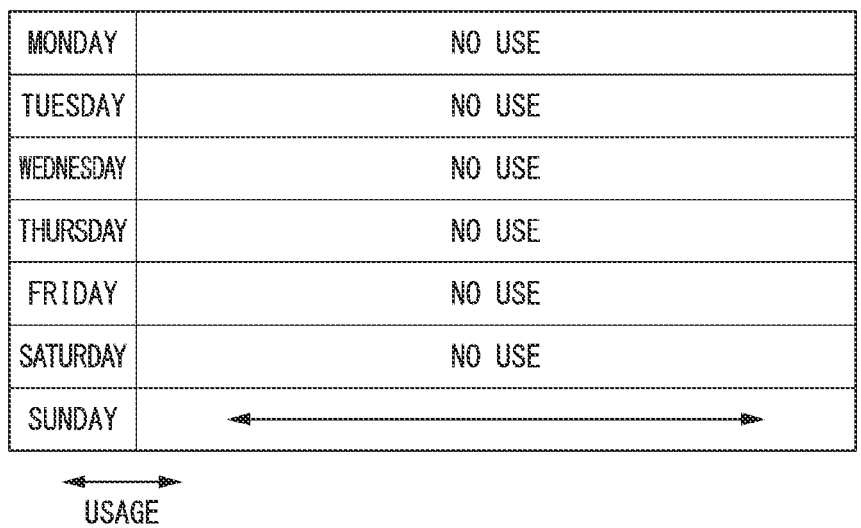
FIG. 14 is a diagram which shows an example of content of usage history information.

FIG. 14 is a diagram which shows an example of content of the usage history information 186. The usage history information 186 is information in which history of a use of the vehicle M2 is stored. The usage history information 186 includes, for example, information indicating whether the vehicle M1 is used for each day of the week or time. The usage history information 186 is information generated on the basis of, for example, history of positional information of the vehicle M2, an operating state of the driver 120 of the vehicle M, and the like. The communication controller 168 may generate the usage history information 186, or another functional unit or another device may generate the usage history information 186.

For example, when the predictor 170 refers to the usage history information 186, and recognizes that the vehicle M2 is used in a predetermined time zone on a predetermined day of the week in a predetermined period as shown in FIG. 14, and the vehicle M2 is not used on another day of the week or another time zone, it predicts that vehicle M2 will be used in the predetermined time zone on the predetermined day of the week. For example, on Friday, the communication controller 168 determines that a time when the vehicle M2 is used next is longer than a specified time on the basis of a result of prediction by the predictor 170, and causes the second communicator 166 to execute communication using the radio wave of the third communication strength.

Figure 15:
FIG. 15 is a diagram which shows an example of content of schedule information.

FIG. 15 is a diagram which shows an example of content of the schedule information 188. The schedule information 188 is information indicating a schedule of the user of the vehicle M2. The schedule information 188 is information acquired by the vehicle M2 communicating with the portable terminal 30 of the user of the vehicle M2 or a terminal device (not shown). The schedule information 188 is, for example, information generated on the basis of a schedule input by the user by operating the portable terminal 30. The schedule information 188 is information indicating the user's schedule for going out. The communication controller 168 may generate the schedule information 188, or another functional unit or another device may generate the schedule information 188.

The predictor 170 predicts a time when the vehicle M2 is used by referring to, for example, the schedule information 188. For example, as shown in FIG. 15, the predictor 170 estimates the time when the vehicle M2 is used by the user on the basis of information such as a departure at 11:00 and a meeting from 0:00. For example, the predictor 170 converts information of the schedule information 188 into semantic information by using an algorithm, a conversion table (a table that converts character information into a meaning of the character information), a learning model, and the like set in advance. The conversion table is a table that converts character information into a meaning indicated by the character information and a table that converts the meaning indicated by the character information into a usage time of the vehicle M2. The conversion table outputs, for example, information indicating the usage time at which the vehicle M2 is estimated to be used and information indicating that the vehicle M2 is not used. The learning model is a model that outputs the information indicating the usage time of the vehicle M2 if character information is input. The predictor 170 may predict, for example, a departure time when the vehicle M2 arrives at a desired arrival time of a destination on the basis of the desired arrival time of the destination of the user and the position information of the vehicle M2.

Figure 16:
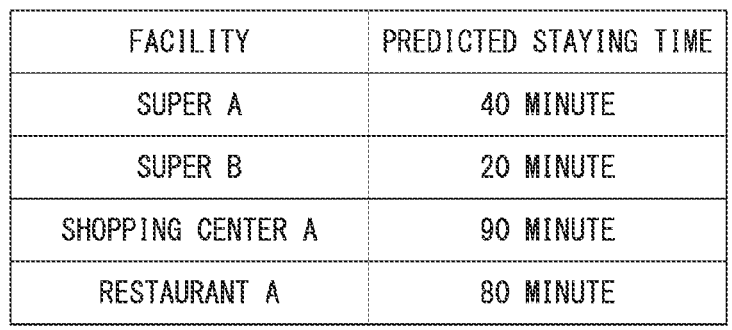
FIG. 16 is a diagram which shows an example of content of facility information.

FIG. 16 is a diagram which shows an example of content of the facility information 190. The facility information 190 is information indicating an expected staying time for each facility. The facility information 190 may be information acquired by the vehicle M2 communicating with an information providing server (not shown), or may be information generated by the vehicle M2. The facility information 190 may be information generated on the basis of a result obtained by deriving a parking time of the vehicle M for each facility in a statistical method on the basis of usage history of the vehicle M2, and may also be information generated on the basis of usage history of the vehicle M and other vehicles.

The predictor 170 predicts a time when the vehicle M2 is used on the basis of, for example, a facility corresponding to a parking lot in which the vehicle M2 is parked, a time at which the vehicle M2 has started to park, and an expected staying time of the facility information 190. For example, it is assumed that vehicle M2 is parked in a parking lot of Super A. A predicted staying time for Super A in the facility information 190 is assumed to be "40 minutes." If the vehicle M2 has started parking at 12:00, the predictor 170 predicts that the vehicle M will depart from the parking lot of Super A at 12:40.

Among the management information 184, the usage history information 186, the schedule information 188, and the facility information 190 stored in the storage 180B, predetermined information may be omitted. For example, if the vehicle M2 is not a vehicle used for a sharing service, the management information 184 may be omitted. Among the management information 184, the usage history information 186, the schedule information 188, and the facility information 190, predetermined information may be preferentially used. For example, the management information 184 is prioritized. If the management information 184 is omitted, the schedule information 188 may also be prioritized.

As described above, the communication controller 168 can obtain the departure time of the vehicle M2 predicted on the basis of the usage history information 186, the schedule information 188, or the facility information 190. The communication device 160 can predict the departure time with higher accuracy by considering the lifestyle of a user.

[Flowchart]

Figure 17:
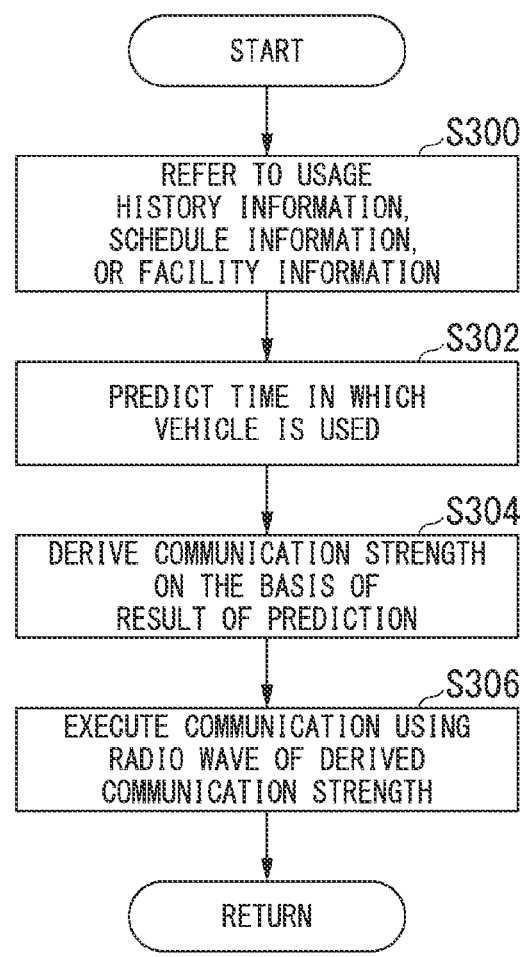
FIG. 17 is a flowchart which shows an example of a flow of processing of the third embodiment.

FIG. 17 is a flowchart which shows an example of a flow of processing of the third embodiment. In the processing, it is assumed that the management information 184 is omitted. First, the predictor 170 predicts a time in which the vehicle M2 is used (step S302) by referring to the usage history information 186, the schedule information 188, and the facility information (information having the highest priority among these types of information) (step S300).

Next, the communication controller 168 derives the communication strength according to a time until the vehicle M2 is used on the basis of a result of the prediction in step S302 (step S304). Next, the communication controller 168 causes the second communicator 166 to execute communication using the radio wave of the derived communication strength (step S306). As a result, processing of one routine of this flowchart ends.

As described above, the communication controller 168 can control the communication strength more accurately on the basis of information reflecting the lifestyle of a user.

According to the third embodiment described above, the same effect as that of the first embodiment can be obtained.

According to each embodiment as described above, the communication device 160 controls the second communicator 166 such that a degree of acceptance of communication between a user and the second communicator 166 increases (to be used by the user more) as a time to departure is estimated to be longer (for example, as the electric energy is smaller or as a time to an estimated departure time is longer). As a result, the convenience for the user is improved.

Modified Example

In the example described above, the communication strength is assumed to be changed, but, instead (or in addition), an available frequency band and the number of communication channels may be changed (in other words, the communication quality may be changed). For example, the communication controller 168 may control the available frequency band or the number of communication channels on the basis of electric energy and a time (specific time) until a use of the vehicle M is started.

For example, the communication controller 168 suppresses the available frequency band or the number of communication channels as the electric energy is larger or the specific time is shorter. "Suppressing" refers to, for example, making one of frequency bands of a 2.5 GHz band and a 5 GHz band unavailable, reducing the number of available communication channels, and the like. For example, the communication controller 168 may communicate using the frequency bands of the 2.5 GHz band and the 5 GHz band when the electric energy is relatively small, and may communicate using the frequency band of the 2.5 GHz band when the electric energy is relatively large. When there is a communication device such as the portable terminal 30 that is already connected to the vehicle M to perform communication, the communication device 160 may also issue a notification to the connected portable terminal 30 instead of or at the same time as controlling the controlling the communication strength and the communication quality. The communication device 160 may also issue a notification to the portable terminal 30 newly connected to the vehicle M. As a result, it is possible to suppress users who newly connect to a vehicle that is about to departure. Even users who use a wireless access point function can be made to recall changes in a communication environment.

As described above, the communication device 160 controls the second communicator 166 according to the electric energy or a specific time. Specifically, for example, the communication device 160 controls the second communicator 166 such that it allows more communication between the user and the second communicator 166 as the time until departure is estimated to be longer. As a result, the convenience for the user is improved.

According to each embodiment described above, the communication controller 168 controls the communication strength of the second communicator 166 on the basis of information for estimating the departure time of the vehicle M (for example, electric energy, a charging time until a full charge or a predetermined charge amount, the management information 184, the usage history information 186, the schedule information 188, the facility information 190), and thereby, the convenience for the user is improved.

[Hardware Configuration]

Figure 18:
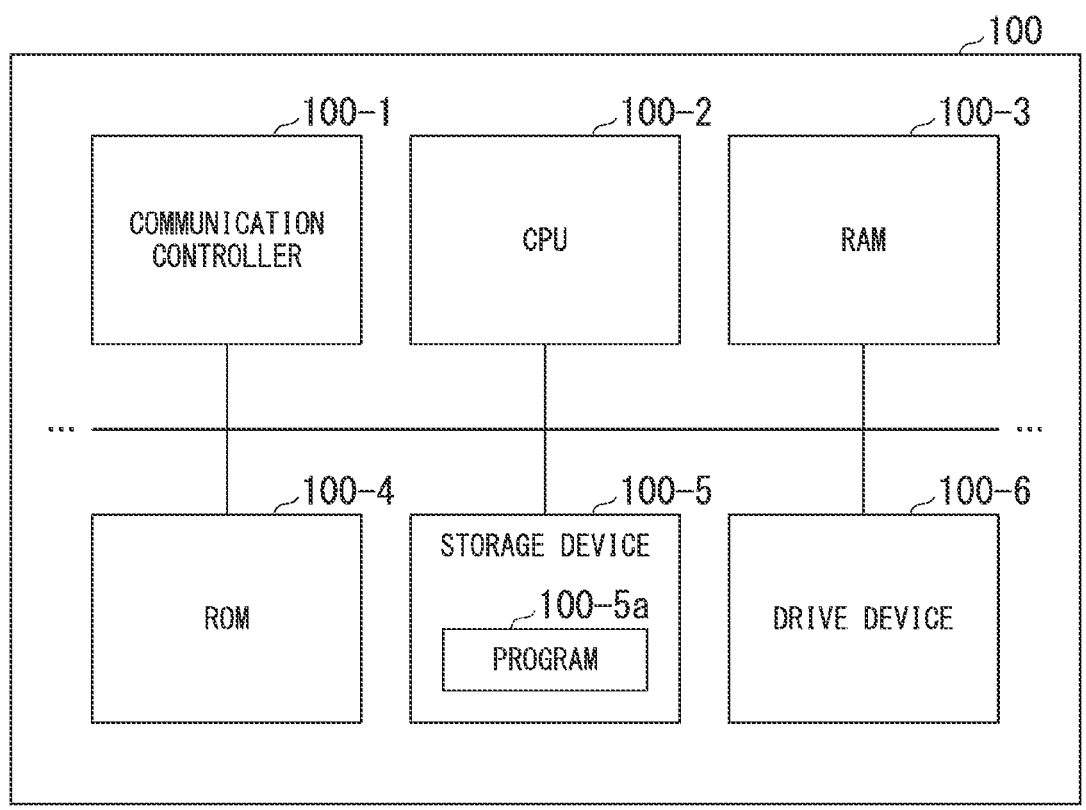
FIG. 18 is a diagram which shows an example of a hardware configuration of an in-vehicle system of the embodiment.

FIG. 18 is a diagram which shows an example of a hardware configuration of the in-vehicle system 100 of the embodiments. As shown in FIG. 16, the communication device 16 is configured by a communication controller 100-1, a CPU 100-2, a random access memory (RAM) 100-3 used as a working memory, a read only memory (ROM) 100-4 that stores a booting program, and the like, a storage device 100-5 such as a flash memory or a hard disk drive (HDD), a drive device 100-6, and the like being connected to each other by an internal bus or a dedicated communication line. The communication controller 100-1 communicates with a component other than the in-vehicle system 100. The storage device 100-5 stores a program 100-5a executed by the CPU 100-2. This program is expanded to the RAM 100-3 by a direct memory access (DMA) controller (not shown) or the like, and executed by the CPU 100-2. As a result, the communication controller 168 is realized.

The embodiments described above can be expressed as follows.

An in-vehicle device is configured to include a storage device that stores a program, and a hardware processor, in which the hardware processor executes the program stored in the storage device, and thereby acquiring electric energy detected by a detector that detects the electric energy of a power supplier which supplies the electric power at least to a driver that causes a mobile body to travel, and controlling at least one of communication strength and communication quality of a communicator that is mounted in a mobile body and functions as a wireless access point based on the acquired electric energy.

Although the embodiments for implementing the present invention have been described as above, the present invention is not limited to these embodiments, and various modifications and substitutions can be made within a range not departing from the gist of the present invention.

What is claimed is:

1. An in-vehicle system comprising:
a communicator that is mounted in a mobile body and functions as a wireless access point;
a detector configured to detect electric energy of a power supplier that supplies electric power at least to a driver which causes the mobile body to travel; and
a communication controller configured to control at least one of communication strength and communication quality of the communicator based on the electric energy detected by the detector,
wherein the communication controller controls the communication strength of the communicator to be a first communication strength when the electric energy is less than a threshold value and controls the communication strength of the communicator to be a second communication strength that is smaller than the first communication strength when the electric energy is equal to or higher than the threshold value.

2. The in-vehicle system according to claim 1,
wherein, when the power supplier is charged by a charging facility outside the mobile body, the communicator functions as the wireless access point.

3. The in-vehicle system according to claim 1,
wherein the power supplier supplies electric power to the driver and the communicator.

4. The in-vehicle system according to claim 1,
wherein the mobile body is a vehicle used for a car sharing service in which a plurality of users jointly use a vehicle.

5. A vehicle in which the in-vehicle system of claim 1 is mounted.

6. An in-vehicle system comprising:
a communicator that is mounted in a mobile body and functions as a wireless access point;
a detector configured to detect electric energy of a power supplier that supplies electric power at least to a driver which causes the mobile body to travel; and
a communication controller configured to control at least one of communication strength and communication quality of the communicator based on the electric energy detected by the detector,
wherein the communication controller controls a communication distance of the communicator such that communication between the communicator and a terminal device present at a first distance from the communicator is possible when the electric energy is less than a threshold value, and controls a communication distance of the communicator such that communication with a terminal device present at the first distance from the communicator is not performed and communication between the communicator and a terminal device present at a second distance shorter than the first distance is possible when the electric energy is equal to or higher than the threshold value.

7. The in-vehicle system according to claim 6,
wherein, when the power supplier is charged by a charging facility outside the mobile body, the communicator functions as the wireless access point.

8. The in-vehicle system according to claim 6,
wherein the power supplier supplies electric power to the driver and the communicator.

9. The in-vehicle system according to claim 6,
wherein the mobile body is a vehicle used for a car sharing service in which a plurality of users jointly use a vehicle.

10. A vehicle in which the in-vehicle system of claim 6 is mounted.

11. An in-vehicle system comprising:
a communicator that is mounted in a mobile body and functions as a wireless access point;
a power supplier configured to supply electric power at least to a driver that causes the mobile body to travel;
an acquirer configured to acquire specific information for estimating a time at which the power supplier supplies the electric power to the driver and causes the mobile body to travel;
a communication controller configured to:
control the communication strength of the communicator to be a first communication strength when a duration until the time based on the specific information is equal to or higher than a threshold value, and
control the communication strength of the communicator to be a second communication strength that is smaller than the first communication strength when the duration until the time based on the specific information is less than the threshold value.

12. The in-vehicle system according to claim 11,
wherein the specific information includes one or more pieces of information among: electric energy detected by a detector that detects the electric energy of the power supplier, a usage history of the mobile body, a usage schedule in which the usage schedule of the mobile body is defined, and a time in which the mobile body has stopped in the past in a facility where the mobile body stops, and
wherein the communication controller controls at least one of communication strength and communication quality of the communicator based on the specific information acquired by the acquirer.

13. The in-vehicle system according to claim 11,
wherein the communication controller controls the communication strength of the communicator to be a first communication strength when the electric energy of the power supplier is less than a threshold value and controls the communication strength of the communicator to be a second communication strength that is smaller than the first communication strength when the electric energy of the power supplier is equal to or higher than the threshold value.

14. The in-vehicle system according to claim 11,
wherein the communication controller controls a communication distance of the communicator such that communication between the communicator and a terminal device present at a first distance from the communicator is possible when the electric energy of the power supplier is less than a threshold value, and
controls a communication distance of the communicator such that communication with a terminal device present at the first distance from the communicator is not performed and communication between the communicator and a terminal device present at a second distance shorter than the first distance is possible when the electric energy of the power supplier is equal to or higher than the threshold value.

\* \* \* \* \*